(12) United States Patent
Sato et al.

(10) Patent No.: US 6,227,169 B1
(45) Date of Patent: May 8, 2001

(54) FUEL SUPPLY SYSTEM FOR INTERNAL COMBUSTION ENGINES HAVING FUEL LEAKAGE RESTRICTING STRUCTURE

(75) Inventors: Yasuyuki Sato, Niwa-gun; Tokio Kohama, Nishio; Kimitaka Saito, Nagoya; Masaaki Yano, Nishikamo-gun, all of (JP)

(73) Assignees: Nippon Soken, Inc.; Toyota Jidosha Kabushiki Kaisha, both of (JP)

( * ) Notice: Subject to any disclaimer, the term of this patent is extended or adjusted under 35 U.S.C. 154(b) by 0 days.

(21) Appl. No.: 09/401,785

(22) Filed: Sep. 22, 1999

(30) Foreign Application Priority Data

Oct. 13, 1998 (JP) .................................. 10-290824

(51) Int. Cl.[7] ................................... F02M 33/04
(52) U.S. Cl. ........................ 123/456; 123/468; 123/469
(58) Field of Search ..................... 123/468, 469, 123/470, 456

(56) References Cited

U.S. PATENT DOCUMENTS

| | | | |
|---|---|---|---|
| 3,841,277 | * 10/1974 | Schafer | 123/470 |
| 4,240,384 | * 12/1980 | Urbinati et al. | 123/470 |
| 4,294,215 | * 10/1981 | Hans et al. | 123/469 |
| 4,327,690 | * 5/1982 | Sauer et al. | 123/469 |
| 4,519,371 | * 5/1985 | Nagase et al. | 123/470 |
| 4,727,843 | * 3/1988 | Petersen et al. | 123/470 |
| 5,022,371 | * 6/1991 | Daly | 123/468 |
| 5,033,435 | * 7/1991 | Ostarello | 123/469 |
| 5,168,856 | * 12/1992 | Lorraine | 123/468 |
| 5,511,527 | * 4/1996 | Lorraine et al. | 123/469 |
| 5,682,857 | * 11/1997 | Briggs et al. | 123/469 |
| 5,752,487 | * 5/1998 | Harrell et al. | 123/470 |

FOREIGN PATENT DOCUMENTS

| | | |
|---|---|---|
| 2-141674 U | 11/1990 | (JP) . |
| 8-312502 | 11/1996 | (JP) . |
| 9-060562 | 3/1997 | (JP) . |
| 9-303226 | 11/1997 | (JP) . |

* cited by examiner

Primary Examiner—Thomas N. Moulis
(74) Attorney, Agent, or Firm—Nixon & Vanderhye PC

(57) ABSTRACT

A delivery pipe of a fuel supply system for injectors mounted on a cylinder head is divided for each injector or a group of injectors. Divided pipe parts are coupled with each other through a flexible member to allow flexing of the delivery pipe. Each injector is connected with the delivery pipe through a flexible coupling member and with the cylinder head through a flexible cushioning member. Alternatively, a fuel passage is formed in the cylinder head in place of the delivery pipe to supply fuel to the injectors after heating in the cylinder head.

10 Claims, 4 Drawing Sheets

FIG. IA
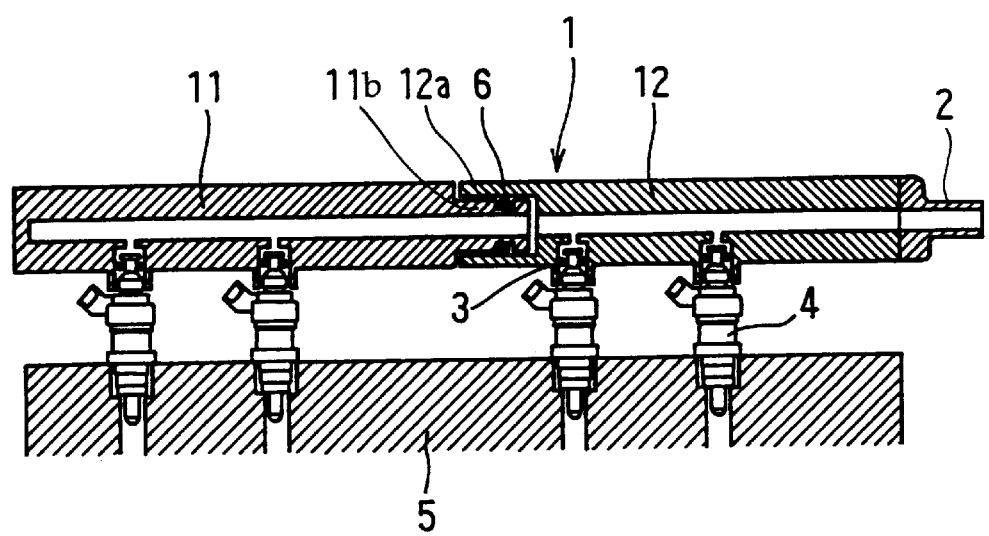
FIG. IB
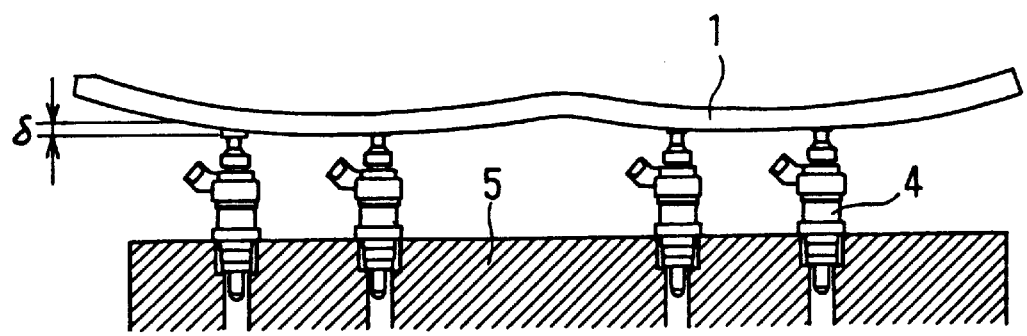

FIG. 3A
FIG. 3B
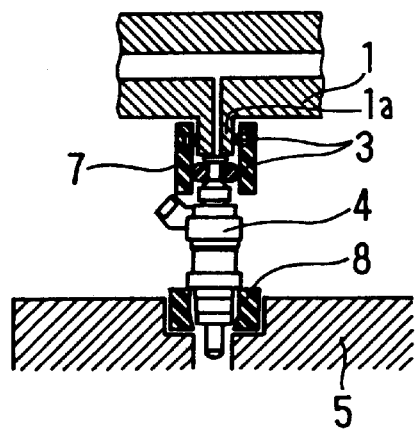
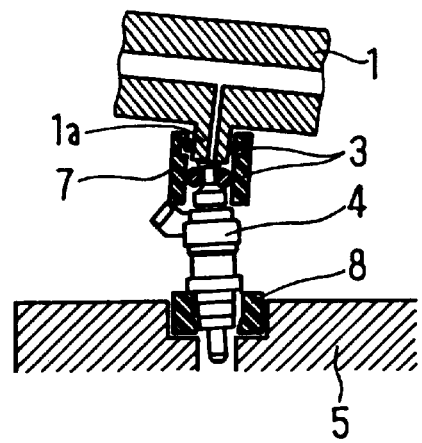
FIG. 4
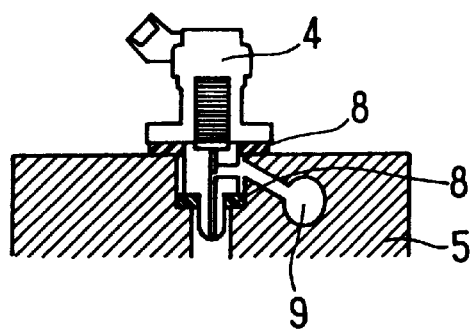
FIG. 5
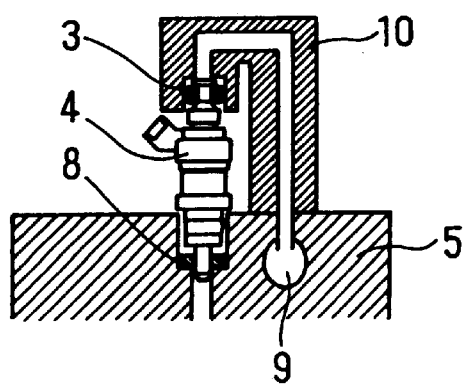

FUEL SUPPLY SYSTEM FOR INTERNAL COMBUSTION ENGINES HAVING FUEL LEAKAGE RESTRICTING STRUCTURE

CROSS REFERENCE TO RELATED APPLICATION

This application relates to and incorporates herein by reference Japanese patent application No. 10-290824 filed on Oct. 13, 1998.

BACKGROUND OF THE INVENTION

1. Field of the Invention

The present invention relates to a fuel supply system for internal combustion engines which has an improved fuel leakage restricting structure.

2. Related Art

A cylinder direct injection type fuel supply system has been proposed for an automotive vehicle gasoline internal combustion engine as shown in FIG. 6A, to improve engine efficiency for environmental protection. In this system, a fuel delivery pipe 1 is connected to a high pressure fuel pump (not shown) via a fuel pipe 2. A fuel injector 4 for each cylinder is mounted on an engine cylinder head 5 so that fuel is directly injected into a combustion chamber. The injector 4 is coupled with the delivery pipe 1 via a rubber sealing member such as an O-ring 3. A high pressure fuel injection is attained by the injector 4 to improve fuel spray atomization. It is important to ensure sealing property in the fuel supply system.

The rubber sealing member 3 fitted between the delivery pipe 1 and the injector 4 tends to change its sealing characteristics largely depending on changes in surrounding temperature. Further, the delivery pipe 1 bows in response to the high fuel pressure by an amount of flexing δ as shown in FIG. 6(B). As a result, use of the rubber sealing member 3 is limited by surrounding conditions (fuel pressure, temperature, etc.).

SUMMARY OF THE INVENTION

It is an object of the present invention to restrict fuel from leaking through a sealing part in a fuel supply system for internal combustion engines.

According to a first aspect of the present invention, a delivery pipe is divided into a plurality parts and adjacent two of the pipe parts of the delivery pipe are coupled with each other at a connecting part having a substantially the same fuel passage diameter as that of the delivery pipe. A flexible sealing member is disposed in the connecting part.

According to a second aspect of the present invention, a coupling member is provided between a delivery pipe and an injector so that the coupling member is coupled flexibly with both of the delivery pipe and the injectors.

According to a third aspect of the present invention, a cushioning member having a sealing property is inserted between an injector and a cylinder head to couple the injector with the cylinder head flexibly.

According to a fourth aspect of the present invention, a fuel passage communicated with a high pressure pump is formed in a cylinder head to supply fuel heated by the cylinder head to an injector.

BRIEF DESCRIPTION OF THE DRAWINGS

The above and other objects, features and advantages of the present invention will become more apparent from the following description made with reference to the accompanying drawings. In the drawings:

FIG. 1A is a cross sectional view showing a fuel supply system directed to a four-cylinder engine according to a first embodiment of the present invention;

FIG. 1B is a cross sectional view showing schematically the deformation of a delivery pipe in the first embodiment;

FIG. 3A is a cross sectional view showing a fuel supply system according to a third embodiment of the present invention;

FIG. 3B is a cross sectional view showing schematically the deformation of a delivery pipe in the third embodiment;

FIG. 4 is a cross sectional view showing a fuel supply system according to a fourth embodiment of the present invention;

FIG. 5 is a cross sectional view showing a fuel supply system according to a fifth embodiment of the present invention;

DETAILED DESCRIPTION OF THE PREFERRED EMBODIMENTS

Figure 2:
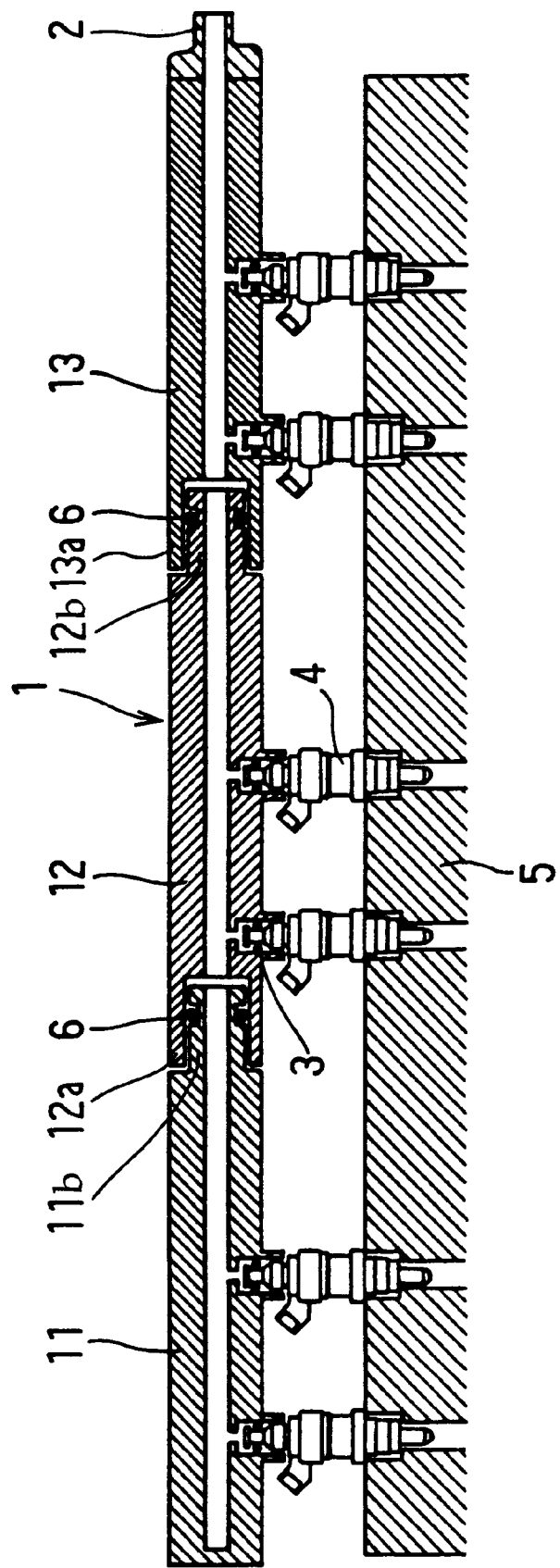
FIG. 2 is a cross sectional view showing a fuel supply system directed to a six-cylinder engine according to a second embodiment of the present invention.

The present invention will be described in further detail with reference to various embodiments in which the same or similar parts are designated by the same or similar reference numerals.

First Embodiment

In the first embodiment directed to a four-cylinder internal combustion engine, as shown in FIG. 1A, a delivery pipe 1 connected to a high pressure pump (not shown) via a fuel pipe 2 is divided into two parts, a part 11 and a part 12. The delivery pipe 1 may be divided into more than two. The parts 11 and 12 are coupled with each other to provide a connecting part therebetween which has the same diameter. A sealing member 6 such as an O-ring made of rubber is interposed between longitudinal ends 11b,12a of the parts 11 and 12, so that the connecting part between the parts 11 and 12 has a flexibility. A fuel injector 4 is coupled with the delivery pipe 1 via a sealing member 3 such as an O-ring made of rubber and mounted on a cylinder head 5 for directly injecting fuel into an engine combustion chamber.

Figure 6A:
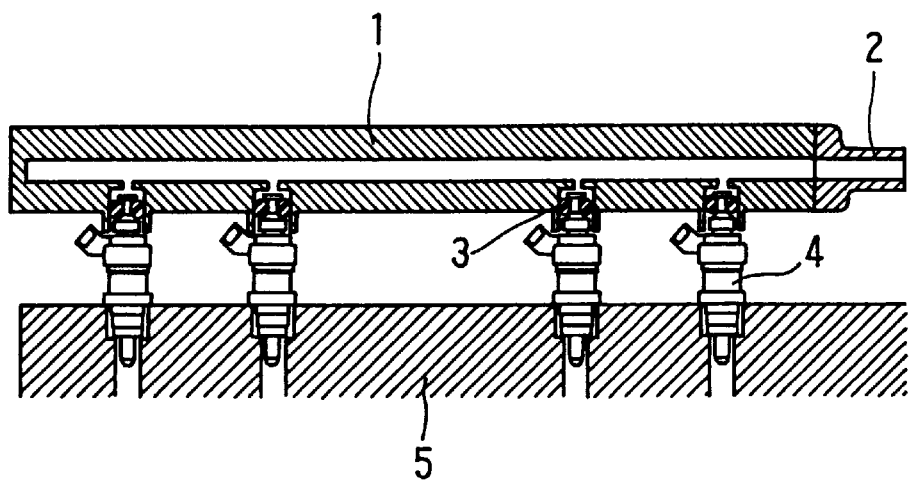
FIG. 6A is a cross sectional view showing a conventional fuel supply system directed to a four-cylinder engine.
Figure 6B:
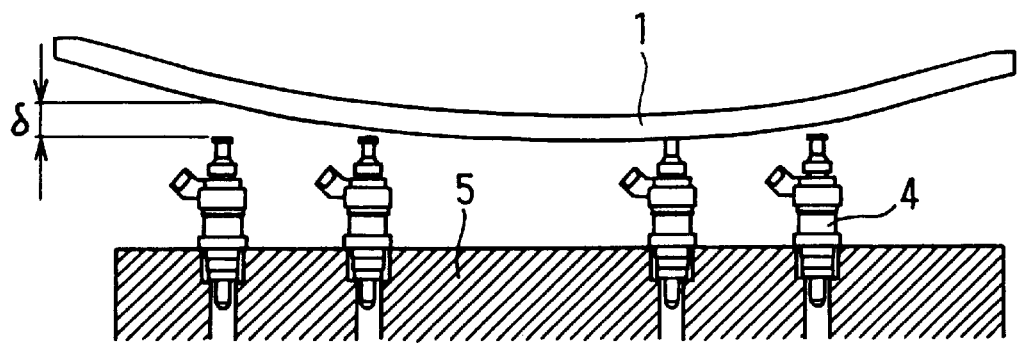
FIG. 6B is a cross sectional view showing schematically the deformation of a delivery pipe in the conventional fuel supply system.

Thus, as shown in FIG. 1B, the deformation in flexing due to bowing of the delivery pipe 1 is absorbed at the part including the sealing member 6. Therefore, the amount of deformation δ is reduced as opposed to the flexing of the single delivery pipe 1 (e.g., FIG. 6A).

Second Embodiment

In the second embodiment directed to a six-cylinder engine, as shown in FIG. 2, the delivery pipe 1 is divided into three, parts 11, 12 and 13. The sealing member 6 is fitted in each connecting part defined by the longitudinal ends 11b, 12b and 13a. It is also possible to divide it at every cylinder to absorb the deformation more and reduce the lessening of the sealing property to a minimum.

Third Embodiment

In the third embodiment, the delivery pipe 1 is in a single pipe form for all the cylinders and has a plurality of extensions 1a extending perpendicularly. As shown in FIG. 3A, a coupling member 7 shaped in a generally cylindrical form is fitted around a connecting part between the injector 4 and the delivery pipe 1, and two sealing members 3 are inserted to provide two flexible sealing parts, one between the extension of the delivery pipe 1 and the injector 4 and the other between the coupling member 7 and the injector 4.

Because the connecting part between the delivery pipe 1 and the injector 4 are thus coupled flexibly with both of the delivery pipe 1 and the injector 4, the deformation of the delivery pipe 1 can be distributed to a part between the coupling member 7 and the delivery pipe 1 and to a part between the connecting part 7 and the injector 4 as shown in FIG. 3B. Thus, the deformation of the delivery pipe 1 can be absorbed. As a result, fuel is restricted from leaking through the connecting part, and the sealing property can be restricted from being lessened.

Further, in the third embodiment, a cushioning member 8 having a sealing property is fitted between the injector 4 and the cylinder head 5 and is coupled flexibly. As a result, the flexing of the delivery pipe 1 can be absorbed by the cushioning member 8, and the fuel is restricted from leaking through the fuel sealing part.

Fourth Embodiment

In the fourth embodiment, as shown in FIG. 4, no delivery pipe is provided. Instead, a fuel passage 9 communicated with the fuel pipe 2 is provided to extend in the longitudinal direction in the cylinder head 5, that is, in the direction in which the combustion chambers are arranged. A communication passage leading from the fuel passage 9 to the injector 4 is also provided in the cylinder head 5. Two cushioning members 8 are fitted between the injector 4 and the cylinder head 5.

Fifth Embodiment

In the fifth embodiment, as shown in FIG. 5, a connecting pipe 10 is positioned adjacent to the outside of the cylinder head 5 to lead fuel from the fuel passage 9 to the injector 4. The sealing member 3 is fitted between the injector 3 and the connecting pipe 10, and the cushioning member 8 having the sealing property is fitted between the injector 4 and the cylinder head 5.

In the fourth embodiment and the fifth embodiment, both of the injector 4 and the fuel passage 9 are provided in the same cylinder head 5 which has a sufficient rigidity. As a result, the fuel passage 9 does not flex and the thermal expansion of the cylinder head 5 does not influence on the fuel passage 9. Thus, fuel leakage due to flexing of fuel passage can be obviated.

Further, the fuel is supplied to the injector 4 from the fuel passage 9 provided in the cylinder head 5. The fuel is heated by the cylinder head 5 and then supplied to the injector 4. As a result, the flexibility of sealing member 3 and the cushioning member 8 which have a remarkably lessened sealing property due to hardening under an extremely low temperature condition can be recovered quickly. This is very advantageous in preventing the fuel from leaking through the fuel sealing part.

In addition, the fuel atomization is improved and a low temperature engine starting ability is improved greatly, because the fuel is heated by the cylinder head quickly.

The present invention having been described above should not be limited to the disclosed embodiments, but may be modified in other ways without departing from the spirit of the invention.

What is claimed is:

1. A fuel supply system for an internal combustion engine having a plurality of cylinders, the fuel supply system comprising:

a plurality of injectors mounted on the engine for injecting fuel into the engine; and a delivery pipe having a fuel passage therein and coupled with the injectors for supplying the fuel to the injectors through the fuel passage, the delivery pipe including a plurality of axially aligned pipe parts and a flexible connecting part connecting each adjacent two of the pipe parts, said flexible connecting part defining a fuel passage therethrough having a substantially same fuel passage diameter as that of the pipe parts, and the connecting parts being flexible to allow flexing of the pipe parts, wherein the delivery pipe is provided at a position spaced apart from a cylinder head of the engine, and each flexible connecting part includes a sealing member made of a flexible material and disposed between longitudinally extending ends of the respective adjacent two pipe parts, thereby to allow flexing of the delivery pipe at each said flexible connecting part.

2. A fuel supply system of claim 1, wherein the injectors are mounted on the cylinder head of the engine for injecting the fuel into the cylinders directly.

3. A fuel supply system for an internal combustion engine having a plurality of cylinders, the fuel supply system comprising:

an injector having first and second ends, and mounted on the engine for injecting fuel from the first end thereof into each cylinder of the engine; and a delivery pipe having an extension coupled to the second end of the injector for supplying the fuel to the injector; and a flexible connecting part fitted between the extension of the delivery pipe and the second end of the injector, the connecting part being flexibly coupled to each of the delivery pipe and the injector, wherein the connecting part includes a cylindrical flexible coupling member fitted around the extension of the delivery pipe at a first end thereof and fitted around the injector at the second end thereof and a plurality of flexible sealing members, one of the sealing members being disposed between the extension of the delivery pipe and the first end of the coupling member and another of the sealing members being disposed between the second end of the injector and the second end of the coupling member.

4. A fuel supply system of claim 3, further comprising:

a cushioning member made of a flexible sealing material and disposed between a cylinder head of the engine and the first end of the injector.

5. A fuel supply system as in claim 1, wherein each flexible connecting part comprises complimentary male and female connecting members of differing outer diameters, whereby the male connecting member is received in the female connecting member, and wherein said sealing member is disposed radially outside the male connecting member and radially inside the female connecting member.

6. A fuel supply system as in claim 5, wherein said male connecting member and said female connecting member are defined by respective axial ends of said adjacent two pipe parts.

7. A fuel supply system as in claim 1, wherein said injectors are each directly coupled to a respective receptacle of a plurality of receptacles defined at spaced locations along the delivery pipe.

8. A fuel supply system as in claim 3, wherein said extension extends in a longitudinal direction of the injector and wherein the coupling member covers both the extension of the delivery pipe and the second end of the injector.

9. A fuel supply system as in claim 3, wherein said delivery pipe is defined as a single integral unit common to each injector.

10. A fuel supply system as in claim 4, wherein the first end of the injector is disposed in the cylinder head and said cushioning member is disposed radially outside thereof, and wherein the other second of the injector is disposed outside of the cylinder head.

* * * * *